(12) United States Patent
Bennett

(10) Patent No.: US 6,915,373 B2
(45) Date of Patent: Jul. 5, 2005

(54) CACHE WITH MULTIWAY STEERING AND MODIFIED CYCLIC REUSE

(75) Inventor: John G. Bennett, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 10/137,521

(22) Filed: Apr. 30, 2002

(65) Prior Publication Data

US 2003/0204664 A1 Oct. 30, 2003

(51) Int. Cl.[7] .............................................. G06F 12/08
(52) U.S. Cl. ............................ 711/3; 711/216; 711/133
(58) Field of Search ............................... 711/3, 133, 216

(56) References Cited

U.S. PATENT DOCUMENTS 5,353,425 A * 10/1994 Malamy et al. ............. 711/144
5,930,819 A * 7/1999 Hetherington et al. ...... 711/131
6,161,166 A * 12/2000 Doing et al. ................ 711/125

* cited by examiner

Primary Examiner—Reginald G. Bragdon
(74) Attorney, Agent, or Firm—Merchant & Gould P.C.

(57) ABSTRACT

In a cache system a steering array indirect maps queries to the cache cells, and a cyclic replacement mechanism allocates the cache cells for replacement in the cache. The cache system has a hash mechanism, a steering array and a cyclic replacement counter. The hash mechanism computes a hash value from arguments in the query. The cache has a plurality of cache cells, and each cell has an answer and a usage bit indicating whether the cell is in use. The steering array stores a cache index based on the hash value, and the cache index points to a cache cell that may contain the answer to the query. The cyclic replacement counter addresses each cell in the cache to determine if the cell is still in use or may store a new answer.

20 Claims, 6 Drawing Sheets

CACHE WITH MULTIWAY STEERING AND MODIFIED CYCLIC REUSE

TECHNICAL FIELD

This invention relates to a memory cache. More particularly the invention relates to optimizing the operation of the cache through multiway steering for cache access and modified cyclic reuse for cache allocation.

BACKGROUND OF THE INVENTION

A cache is a mechanism where the parameters and results of previous queries are kept and may be rapidly checked against a current query to avoid the costs of performing the full query mechanism. If the parameters of the current query are found to match those of a saved query then the answer may be provided out of the cache, saving time.

Each combination of parameters and answer stored in a cache is called an "element" or a cell or a slot. Cache elements can be expensive in size and lookup cost. This is because they not only have to save the answer, but they also have to retain the parameters to uniquely and safely ensure the new query is a correct match. In general the size of a cache element includes the size of arguments, the size of an answer, plus any machinery necessary to confirm the match of the current parameters to the saved parameters.

Caches become a "hot spot," an area of memory and code which is always in use since even if a lookup fails, it will be attempted and this keeps the cache in constant use. The size and time cost of a cache therefore competes aggressively for the most current resources. This means there is always pressure to minimize the size and time cost of a cache while yet yielding as little as possible of its effectiveness at retaining useful results and maximizing the percentage of successful matches (the "hit rate").

Caches need a search mechanism. This is how the incoming parameters are converted to a prescription for which elements of the cache to search. In an ideal cache, the search is "content addressable" or "fully associative." This means that all cache elements are searched. The search may be parallel, by broadcasting the current parameters to every element and including a copy of the machinery to match against prior parameters in every element. The search may be serial, checking each element against the current parameters using a single copy of the comparison machinery. Or it may be some combination, taking N elements (where N is generally some divisor of the total number of elements) simultaneously through N copies of the comparison machinery ("N-way"lookup).

Since comparison machines are generally large and consume power the use of completely parallel search prevails only either in caches with small numbers of elements, or in moderately sized caches which can somehow optimize the size and power of the many copies of comparison engine in return for greater specificity (for example by using bit-serial comparison). It is most common for an N-way comparison mechanism to be used (including N=1) since this is a fairly general and flexible way to make the engineering tradeoffs. A cache with N elements all simultaneously searched is called an N-way set associative cache, and the N-elements which are chosen for the comparison are called a "set" of elements.

Hashing is a part of a lookup technique commonly used for N-way designs. A hash is a function which seeks to fold and obfuscate a set of parameters to result in a small number, the hash, which is likely to be distinct for distinct sets of parameters. In general if there are M sets of elements, then the hash will be a number from 0 to M−1, thus having M distinct values. The parameters will map down to one of these M values, and we know that the match, if found, will be in the set identified by that value. The cache then contains M*N elements. When N=1 such an arrangement is called "direct mapped" because the hash function maps directly onto the only element which will be considered.

Replacement is one of the most subtle and important problems in cache design. The issue here is that a cache generally has many fewer elements than there are distinct queries. The cache still has a benefit because in many situations there are some queries which are much more common than others. In general, the distribution of queries changes over time, and so the contents of the cache must also change over time in order to track what is most likely to be asked. This leads to the problem of when to put new values into the elements: when to replace an existing element's content with something which is expected to be a more useful content.

The ideal replacement decisions are usually not practical, since it would involve knowing what is to come in the future. Conversely, the most conservative replacement strategy, no replacement, is practical only in situations where a prior study can choose a good set of cache content which will remain valid forever. Usually, however, a cache does adapt and it uses recent history to predict the future. In particular the most common algorithms for replacement all start by putting any newly seen and qualified (filtered to exclude strange queries, if such a filter is known) into the cache. Since the cache has a fixed number of elements that implies also choosing one to remove.

Replacement strategy is closely tied to "set" organization. This is because if a hash selects an N-way set then the new content must go into that set, and so also the discard must come from that set. Choice of replacement is usually made by some algorithm that attempts to distill out of recent set history a guide to which element has been least active and is thus deemed least likely to be useful.

It is important to consider some of the tradeoffs in cache design. Suppose that a cache of size P elements could be factored in various ways, for example as a P*1 direct map, or as an M*N set mapping. The direct map has the advantage that the hash function will have the largest number of distinct values, and the comparison mechanism will require only one copy, and only one element needs to move to the comparison mechanism. This makes a direct cache fast, but it has a flaw—replacement. Since the set size is 1, you have no flexibility in what you replace. The Achilles heel of direct mapped sets is hot conflicts, where two currently active queries happen to map to the same hash number and therefore keep tossing each other out of the cache, leading to very poor worst-case performance. In some applications a few such conflicts present involving frequent queries can cause more cache misses than all the other queries put together.

The choice of discard is usually the biggest part of the design of a replacement strategy. That is because the qualification, hash and N-way choices determine the insertion of new content, but there are many ways of deciding which elements are most worthy to discard. The best known generic algorithm is the Least Recently Used (LRU) mechanism which research has repeatedly shown to be a good all around performer especially if the set size is large. Unfortunately as the set size (N) becomes large it also becomes increasingly difficult to implement. A 4-way LRU can be done with a manageable 5 bits of state per set and a 24 element transition lookup table, but 6-way LRU requires 10 bits and 720 entries (rarely practical), and 8-way is simply impractical at 16 bits and 40,320 entries. Yet, a set size of 6 is really not that great for assuring that LRU performance will approximate ideal. Usually set sizes larger than 4 give up on LRU and adopt some other strategy such as circular replacement.

There are many other considerations. However, as general background, this is sufficient introduction to the issues of size, speed, complexity, power, organization, and replacement strategies which must be balanced in cache design. It is with respect to these considerations and others that the present invention has been made.

SUMMARY OF THE INVENTION

In accordance with the present invention, the above and other problems are solved by use of a steering array for indirect mapping to the cache cells and by use of a cyclic replacement mechanism for allocation of cache cells. The steering array is between the hash mechanism and the cache so that the hash index points to the steering array index and the steering array index points to the cache cell. The steering array decouples the hash mechanism from cache cell allocation—cyclic replacement decision.

In accordance with other aspects, the present invention relates to a cache system for retrieving an answer in response to a query. The cache system has a hash mechanism, a steering array and a cyclic replacement counter. The hash mechanism computes a hash value from arguments in the query. The cache has a plurality of cache cells, and each cell has an answer and a usage bit indicating whether the cell is in use. The steering array stores a cache index based on the hash value, and the cache index points to a cache cell that may contain the answer to the query. The cyclic replacement counter addresses each cell in the cache to determine if the cell is still in use or may be replaced with a new answer. A single steering array may be used with a single cache array. To handle collisions between queries producing the same hash value, a link index may be provided in a first cache cell addressed by the cache index. The link index provides access to a second cache cell having a previous answer for another query producing the same hash value. Also parallel cache arrays and parallel steering arrays may be used to provide more than one cache element for queries producing the same hash value.

In accordance with still other aspects, the present invention relates to a method of optimizing the use of a cache in a computing system. The method begins by indirectly mapping a query to a cache cell in a cache array. Additional acts of the method are retrieving an answer from a first cache cell mapped to by the act of mapping, and retrieving an old answer from a second cache cell mapped to by the act of mapping. If neither act of retrieving is successful, an act of searching searches for a new answer outside of the cache, and an act of cyclic accessing through cells in the cache to replace an answer in a cell with a new answer from the act of searching are both performed.

These and various other features as well as advantages, which characterize the present invention, will be apparent from a reading of the following detailed description and a review of the associated drawings.

DETAILED DESCRIPTION OF THE INVENTION

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 1:
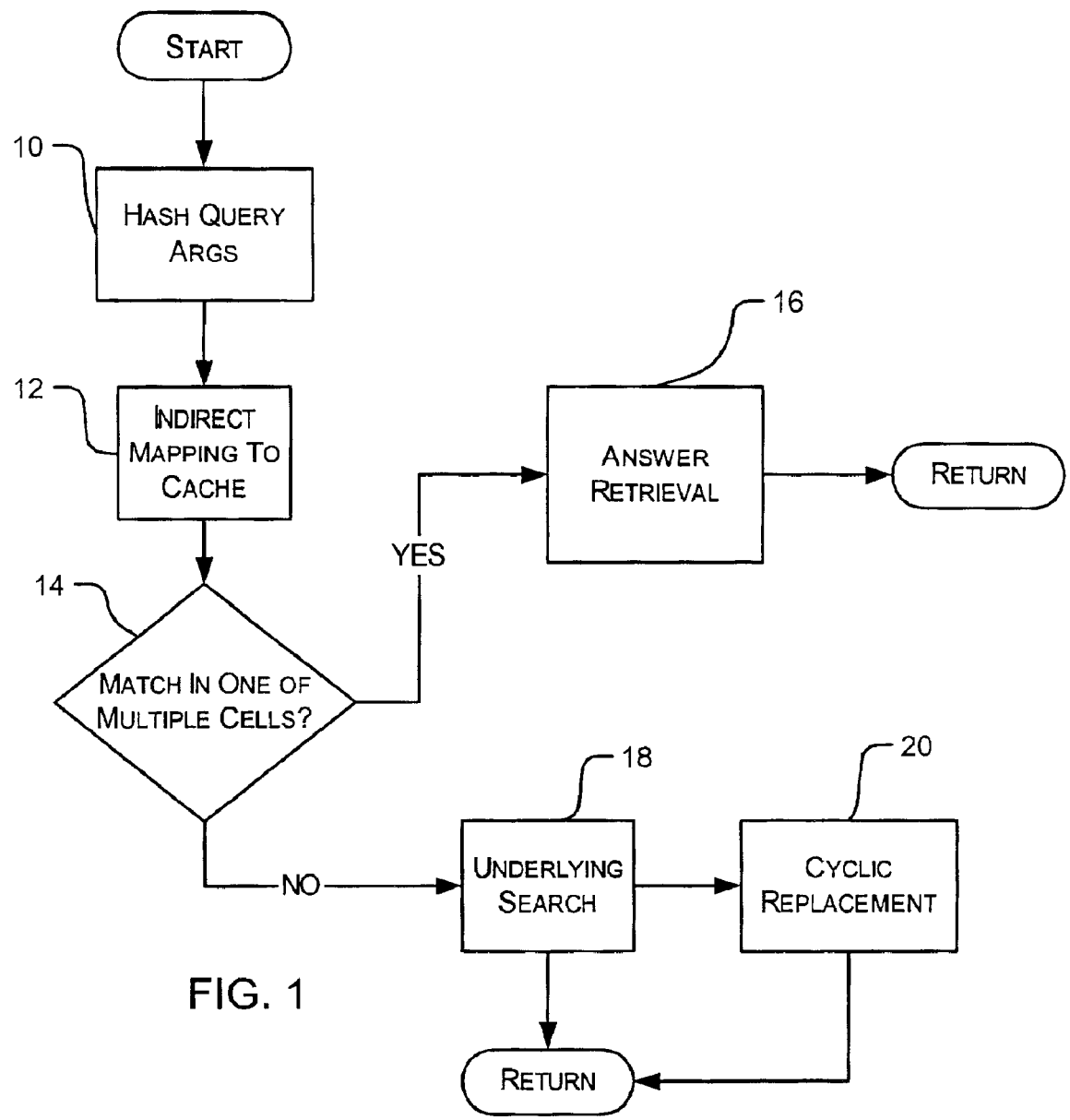
FIG. 1 shows one preferred embodiment of the operational flow of the invention using indirect mapping and the cyclic replacement in a cache system.

FIG. 1 shows one embodiment of the invention illustrating the operations of the invention including the cyclic replacement and the indirect mapping. When there is a triggering event such as a query for stored information, the indirect mapping operation begins at hash operation 10. Hash operation 10 takes the arguments of the query and generates a hash value from the query arguments which points to a location in a steering array. Look-up operation 12 retrieves a cache index from the steering array location addressed by the hash value. This cache index will point to a cache element or cache cell. Cache element or cache cell are used interchangeably herein in the description and drawings. The cache cell contains an answer to the query along with the arguments of the query and the hash value for the query. It is possible however that the information in the cache cell has been replaced in response to another query. It is also possible that another query with dissimilar arguments has produced the same hash value and thus the same cache index is provided by the steering array for the other query.

Multiple cell query match module 14 detects whether a cache cell among possibly multiple cache cells, which were addressed based on a common hash value, contains arguments that match the arguments of the query. If the arguments match for one cell among the multiple cells addressed based upon a common hash value, the operation flow branches YES to answer retrieval module 16. Answer retrieval module 16 retrieves the answer and sets a usage bit. The usage bit indicates the cell is recently used as will be described hereinafter. If the arguments do not match, the operation flow branches NO to underlying search module 18. This latter event indicates the answer cannot be retrieved from cache, and the answer must be retrieved from main memory or other storage devices in the storage system such as magnetic or optical disk drives. Underlying search module 18 searches the storage system based on the query arguments for the answer to the query. If successful, the answer is retrieved and operation flow passes to cyclic replacement module 20. If the underlying search is not successful, a query failure message is sent, and the operation flow returns to the main program.

When the underlying search is successful, cyclic replacement module 20 then finds an available cell in the cache and stores the answer in this cache cell. To find a first cache cell to store a new answer in, cyclic replacement module 20 selects the next available cache cell in the cache array as addressed by the cyclic replacement module.

Each cache element or cache cell has a usage bit; if the usage bit is set, then the cell is in use. An in-use cell has been accessed at least once since the last time the replacement module cycled through the cache. After an in-use cache cell is accessed by the replacement module, the usage bit is reset or cleared, and the replacement module advances to the next cache cell. This continues until a cache cell is found where the usage bit is already clear. This cell is an available cell meaning it is available for replacement, i.e. for storage of a new answer first. The replacement module 20 then stores in the first available cache cell the new answer retrieved by the underlying search. The available cell becomes a new cell in the sense that it now contains a new answer. The query arguments associated with the new answer are also stored in the new cache cell. The usage bit in the new first cell is cleared so, if the new cell is not used in the next cycle through the cache by the replacement module, the new cell is again available for replacement.

Because there is the possibility of a collision of two or more queries with different arguments generating the same hash value, it is possible that a subsequent query with the same hash value might be looking for another answer. This is why an old answer associated with the same hash value is retained in what is now a second cell or old cell.

Figure 2:
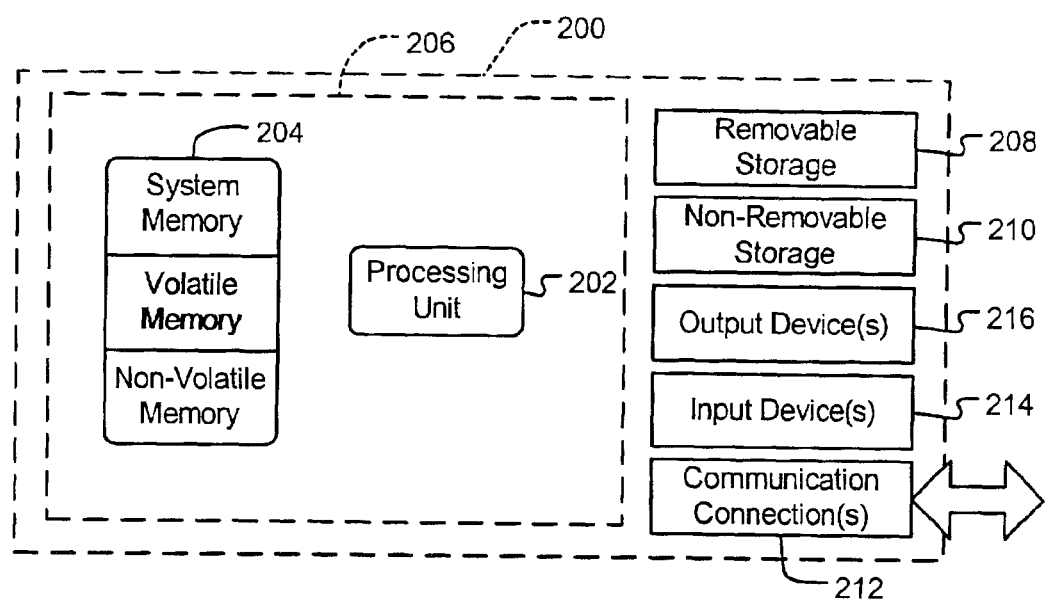
FIG. 2 shows an exemplary computing system environment in which the present invention might be implemented.

The cache system in the embodiments of the present invention may be in a computer system 200 shown in FIG. 2. The system 200 has at least one processor 202 and a memory 204. In one embodiment the cache and steering array consume a portion of the memory 204. In another embodiment of the invention, the processor 202 uses memory 204 to provide the cache and the storage system for underlying search includes memory 204, removable storage 208 and non-removable storage 210. The processor 202 performs the operations described herein for the cache system. Of course a separate processor (not shown) could be used as a storage system controller and the operations of the cache system could be performed by that processor.

In its most basic configuration, computing system 200 is illustrated in FIG. 2 by dashed line 206 encompassing the processor 202 and the memory 204. Additionally, system 200 may also include additional storage (removable and/or non-removable) including, but not limited to, magnetic or optical disks or tape. Such additional storage is illustrated in FIG. 2 by removable storage 208 and non-removable storage 210. Computer storage media, such as memory 204, removable storage 208 or non-removable storage 210 includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200. Depending on the configuration and type of computing device, memory 204 may be volatile, non-volatile or some combination of the two.

System 200 may also contain communications connection(s) 212 that allow the device to communicate with other devices. Additionally, system 200 may have input device(s) 214 such as keyboard, mouse, pen, voice input device, touch input device, etc. Output device(s) 216 such as a display, speakers, printer, etc. may also be included. All these devices are well known in the art and need not be discussed at length here.

A computing device, such as computing system 200, typically includes at least some form of computer-readable media. Computer readable media can be any available media that can be accessed by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
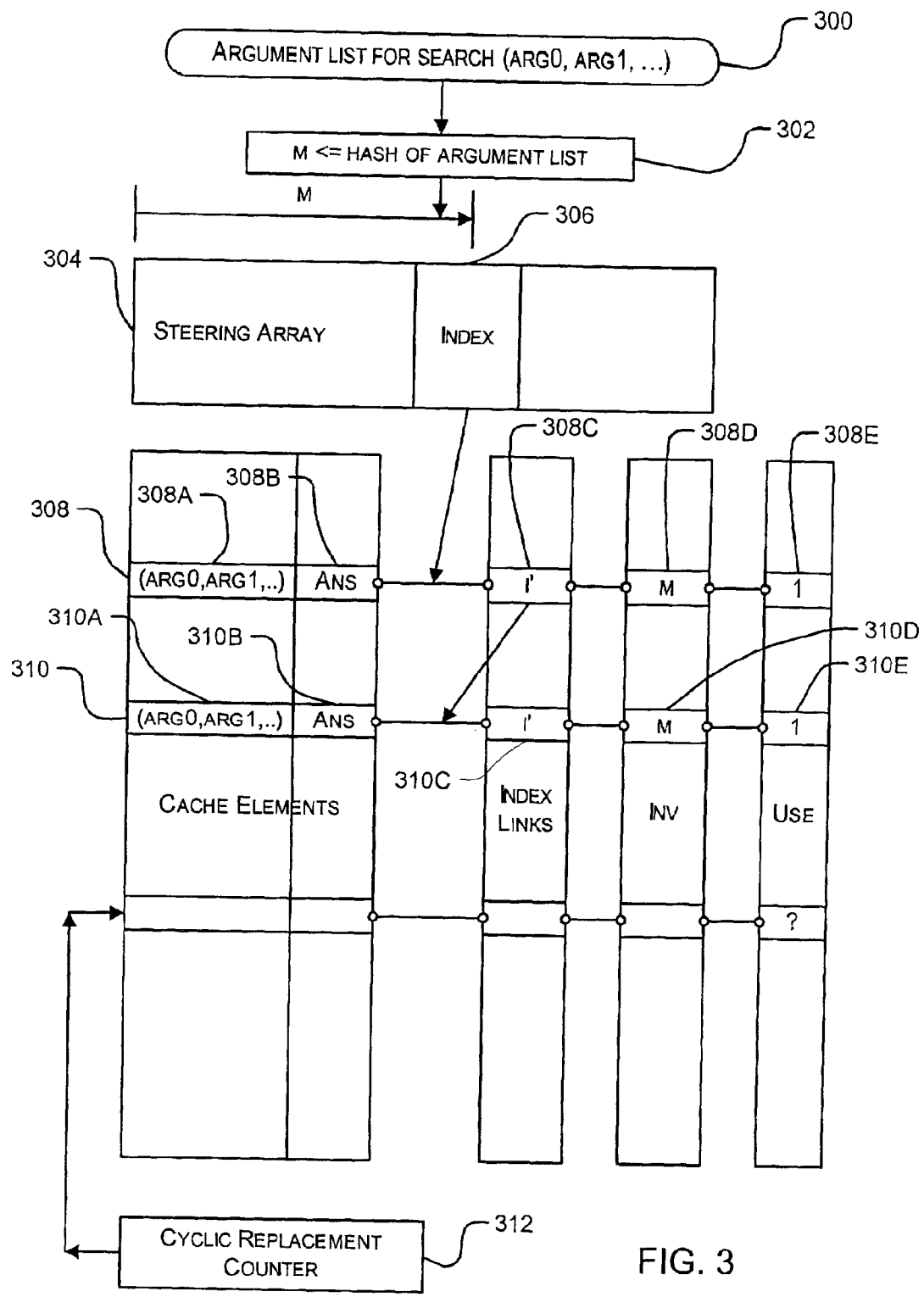
FIG. 3 illustrates one embodiment of the invention using a cache system with a single array of cache elements and chaining for second matches in the event of collisions.
Figure 4:
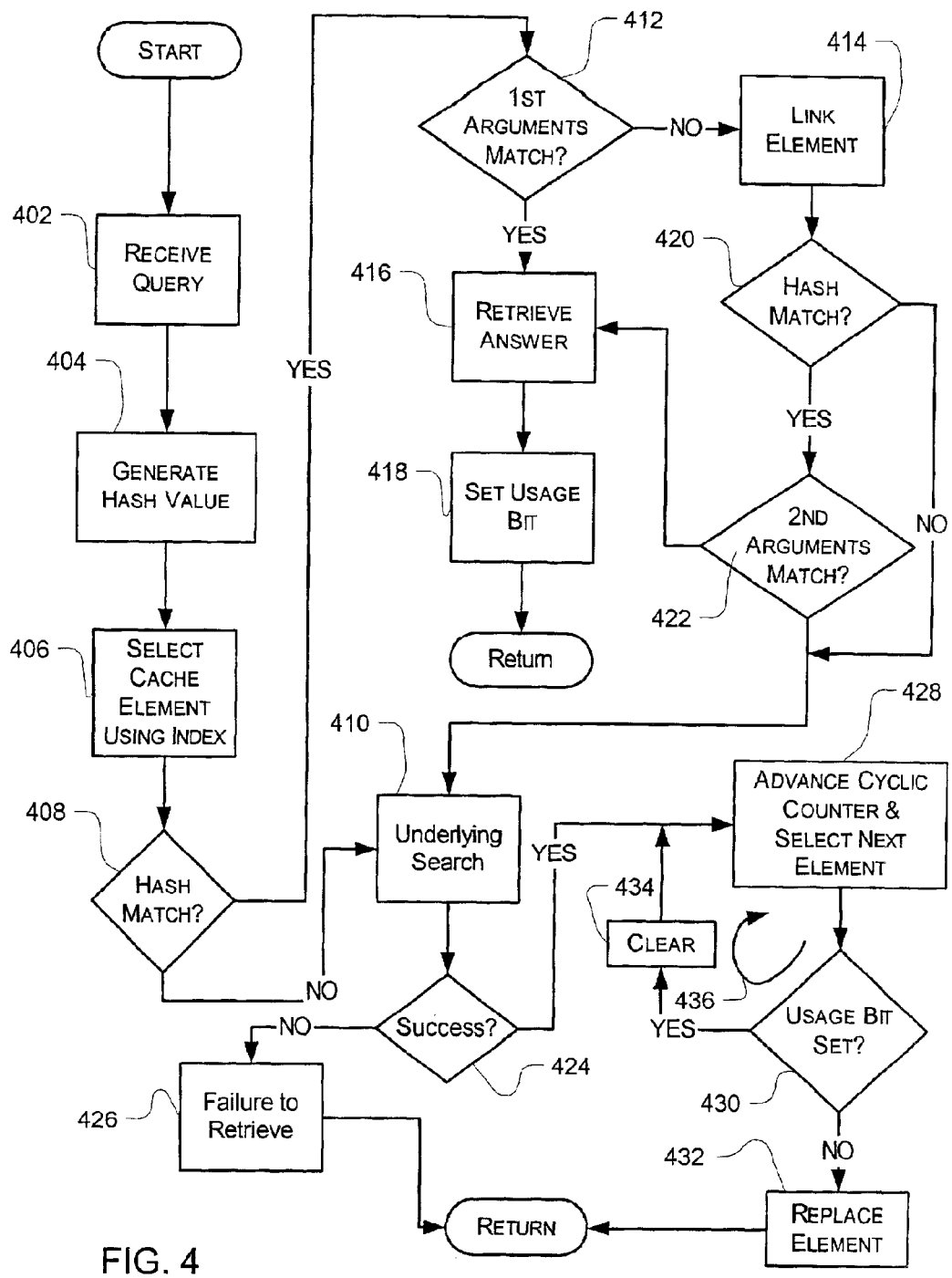
FIG. 4 shows an operation flow for the embodiment of the invention in FIG. 3 using indirect mapping with linking to a second cache element and cyclic replacement.

FIGS. 3 and 4 illustrate another embodiment of the invention where the first and second cache elements or cache cells are in a single cache array. FIG. 3 illustrates the architecture of a cache system using a single steering array and a single cache array. The query argument list 300 is received by the hash mechanism 302. Hash mechanism 302 creates the hash value M which is passed to the steering array 304. The Steering array retrieves the cache cell index at a location 306 in the steering array addressed by the hash value. The cache index is then used to locate a first cell in the cache array. Each cache cell or cache element contains the arguments, the answer, the hash value, the usage bit and a link to a second cell. For example, in the first cell 308, the cell contains arguments 308A, answer 308B, link index to second cell 308C, hash value 308D and usage bit 308E. The second cell 310 which is pointed to or linked by the link index in the first cell contains the old answer for a query producing the same hash value. A cyclic replacement counter 312 accesses each cache element in turn as the counter is advanced to perform cyclic replacement when new answers are stored in the cache. While FIG. 3 shows one link from a first cell to a second cell, in other embodiments of the invention third, fourth or more cells might be successively linked.

The operation of the cache system in FIG. 3 is illustrated in the operational flow of FIG. 4. In FIG. 4, the operational flow begins by receiving the query at receive operation 402. The query contains the argument list for the search to be performed to find the answer. Hash operation 404 operates on the arguments and generates a hash value from the arguments. This hash value is used by select operation 406 to retrieve a cache index and use the cache index to select the cache element 308 based on a cache index. The cache index is found in the steering array 304 by using the hash value as a look up in the steering array or by using the hash value to address a location in the steering array.

Hash match test 408 compares the hash value stored at location 308D in a first cache element or cache cell 308 selected using the cache index. If the hash values match, then this first cell may contain the answer for the query. If the hash values do not match, cache searching terminates and the operation flow branches NO to the underlying search operation 410. If the hash value in location 308D does match the hash value generated from the query, the operation flow branches YES to arguments match operation 412. The first arguments match operation 412 along with the retrieve answer operation 416 make up a first cell retrieve operation. If the arguments at location 308A in the first cell do match with the arguments in the query, then the answer at location 308B is retrieved by the retrieve operation 416. When the answer is retrieved, then set operation 418 sets the usage bit at location 308E in the first cell 308.

If the arguments in the first cell do not match the arguments in the query, the operation flow branches NO from match operation 412 to the link operation 414 which links the cache search to the second cell 310 (FIG. 3). The link operation uses an old cache index stored at location 308C in the first cell to find the second cell 310. A second cell retrieve operation is made up of hash match operation 420, second arguments match operation 422 and the retrieve answer operation 416.

The second hash match operation 420 compares the hash value in location 310D of cache cell 310 against the hash value generated from the query. If there is a match, the operation flow branches YES to the second arguments match operation 422. Second arguments match operation 422 compares the arguments of the query against the arguments stored at 310A location in cache cell 310. If the arguments match, then the operation flow branches YES to retrieve answer 416 and retrieves the answer for the query from the second cell 310 at location 310B. Again, after the answer is retrieved, the set operation 418 sets a usage bit, which in this case is the usage bit in location 310E of cell 310. If the arguments do not match, then the operation flow branches NO from second arguments match 422 to the underlying search operation 410. In effect, the search through cache has failed and the underlying search has begun. Similarly, if the second hash match operation 420 did not find a compare between hash values then the cache search has failed and the operation flow branches NO from operation 420 to underlying search operation or module 410.

In another embodiment of the invention a second link element in the second cell could link to a third cell. The hash value and third cell arguments could be checked to determine if the answer is in the third cell. Of course any number of cells with old or previous answers and links to those cells could be used.

Underlying search module 410 operates in the manner previously described for underlying search module 18 in FIG. 1 but the success test operation for the search is shown as test operation 424 in FIG. 4 and the notice of failure operation is shown as operation 426 in FIG. 4. In the underlying search, the system will search the remaining areas of the storage system outside the cache to find the answer to the query. This search will be based on the query arguments and might extend to other portions of the memory or to the removable storage device 208 or the non-removable storage device 210. If the underlying search is not successful, the operation flow will branch NO from success test operation 424 to the failure notification operation 426. Failure notification operation 426 will send back a message to the system that the search for an answer to the query has failed. Thereafter, the operation flow returns to the main program.

If the underlying search operation is successful, then the success test operation 424 will branch the operation flow YES to the advance and select operation 428. The cyclic replacement module 20 (FIG. 1) is expanded in FIG. 4 and in this embodiment is made up of the advance and select operation 428, the usage bit test operation 430, the replace element operation 432 and the clear operation 434. The cyclic replacement module begins its operation with operation 428 advancing the cyclic counter one count to select the next cache element from the cache array in FIG. 3. The selection of the next cache element or cache cell by the cyclic counter is independent of the cache elements being accessed or addressed through the cache index retrieved from the steering array.

When the cache element is accessed by the cyclic counter, usage bit test operation 430 tests whether the usage bit is set. If the usage bit is set, then the cache element is not available for replacement, and the operation flow branches YES to clear operation 434. Clear operation 434 clears the usage bit or resets it and returns the operation flow to advance and select operation 428. Advance and select operation 428 then advances the counter to select the next cache element. The operation flow loop 436 continues until a cache element or cache cell is selected where the usage bit is not set. In this event, the operation flow branches NO from test operation 430 to replace element operation 432.

The answer, i.e. a new answer, found by underlying search operation 410 is now loaded into the cache element selected as available for answer replacement. The selected cache element effectively becomes a new first cell, and the arguments would be stored along with the answer, the link index to the second cell, and the hash value. The usage bit in the new first cell is not set since the answer has just been loaded. In effect the new first cell must earn its right to stay in the cache by being accessed before the cyclic replacement counter gets to it in the next cycle through the cache. The replacement operation also places the new cache index for this new first cell in location 306 of the steering array 304. When the replacement operation is complete, the operation flow returns to the main program.

Figure 5:
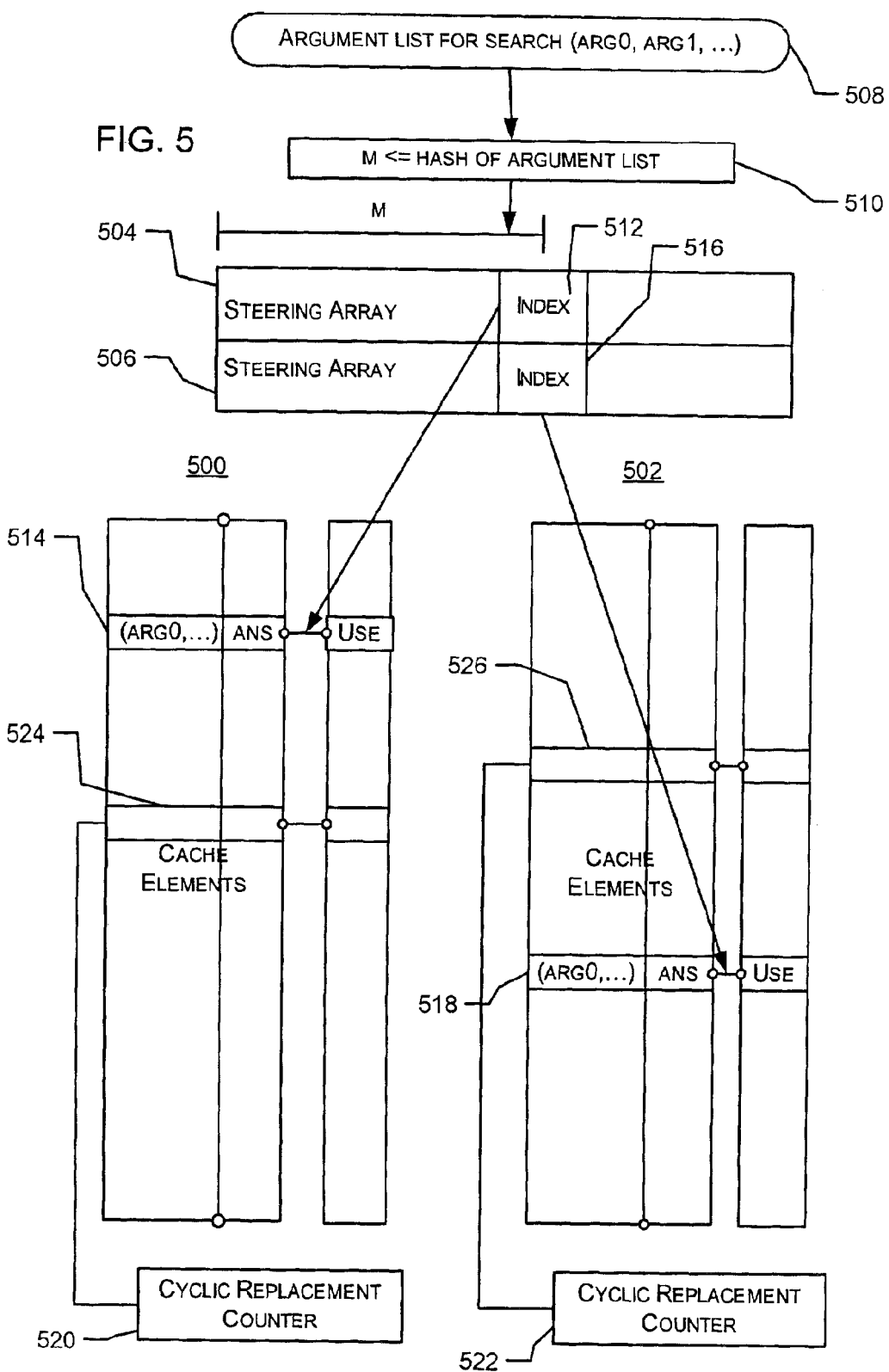
FIG. 5 illustrates another embodiment of the invention with a cache system having parallel arrays of cache elements and parallel steering arrays.

In another embodiment of the invention, first and second cache elements are located in separate cache arrays. In the cache system shown in FIG. 5. there are parallel cache arrays 500 and 502. These cache arrays are addressed through parallel steering arrays 504 and 506. In FIG. 5, the argument list 508 from the query is received at the hash mechanism 510. The hash mechanism 510 computes the hash value from the argument list and uses it to access or address the parallel steering arrays 504 and 506. At the hash value address in the steering arrays, cache index 512 is retrieved and used to address or access cache element 514 in cache array 500. At the same time, cache index 516 in steering array 506 is used to access cache element 518 in cache array 502. The arguments in cache elements 514 and cache element 518 are compared to the argument list of the query to determine if either cache element contains the answer for the query. If it does, then the answer will be returned in response to the query.

Cache array 500 has a cyclic replacement counter 520 while cache array 502 has a cyclic replacement counter 522. When the cache retrieval is unsuccessful, the cyclic replacement counters are used to increment through the cache elements to replace unused answers with new answers found by an underlying search. While FIG. 5 illustrates two cache arrays and two steering arrays, it will be apparent to one skilled in the art that more than two cache arrays and more than two steering arrays might be used to expand the number of cache cells accessed based on a single hash value. The operational flow in a parallel cache array, parallel steering array embodiment of the invention as shown in FIG. 5 is illustrated in FIG. 6.

Figure 6:
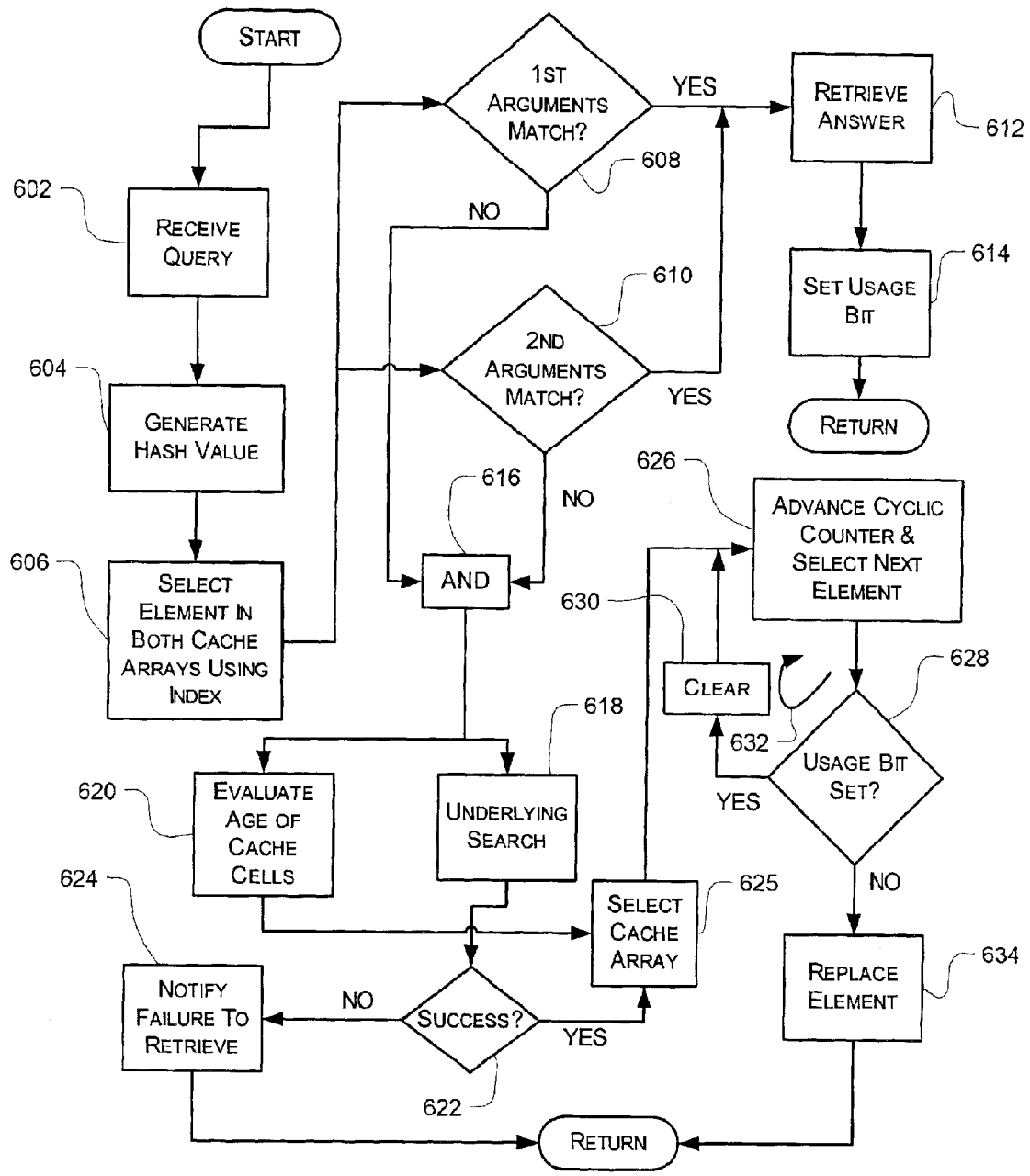
FIG. 6 shows an operation flow for the embodiment of the invention in FIG. 5 with indirect mapping to cache elements in the separate parallel arrays and cyclic replacement in each cache array.

In FIG. 6, receive operation 602 receives the query including its argument list. Compute operation 604 takes the argument list and from the arguments computes the hash value for the query. The hash value is used by select operation 606 working with the steering arrays 504, 506 to find the cache indexes for cache elements in both cache arrays. With the cache element successfully addressed from the steering arrays, select operation 606 retrieves one cache element from one cache array and another cache element from the other cache array. The first arguments match operation 608 and the second arguments match operation 610 will operate in parallel to compare the argument list from the query against the arguments in cache element 514 and cache element 518 respectively. If one of these match operations is successful, the operation flow branches from operation 608 or 610 to retrieve answer operation 612. Retrieve operation 612 retrieves the answer from the cache element 514 or 518 that provided the arguments that matched the argument list in the query. This answer is sent back as a reply to the query. At the same time, the cache element that provided the answer has its usage bit set by set operation 614. The operation flow then returns to the main menu.

If both the first arguments match operation 608 and the second arguments match operation 610 fail, i.e., neither cache element 514 or cache element 518 contains the argument list that matches the query. A logical "AND" of these conditions by operation 616 indicates a failed cache retrieval condition. This condition passes operation flow to the underlying search operation 618 and the evaluate age operation 620 in parallel. The underlying search operation proceeds as previously described for underlying search operation 410 in FIG. 4. The underlying search operation checks the storage devices outside of the cache memory looking for a match with the query arguments to find an answer for the query.

Evaluate age operation 620 is evaluating whether to overwrite a cache element in array 500 with a new answer or overwrite a cache element in array 502 with a new answer. Based on the hash value the cache indexes which are in the steering array 504 and 506 indicate the present cache elements with possible answers to queries generating that hash value. One of those cache indexes is about to be overwritten with a new cache index for the new cache element with the new answer found by underlying search operation 618. The cache index that is not overwritten will in effect be pointing to an old answer for query with the same hash value from query arguments. So the question becomes which old answer is it better to preserve. Logically, it would seem to be better to preserve the old answer having the longest remaining cyclic replacement life. This could be determined by measuring the position or address of the cyclic replacement counter for the cache array against the cache index or address pointing to the cache element currently being addressed by the steering array. If the cyclic replacement counter address has just moved past the position of the cache element addressed from the steering array, then that cache element with the old answer will have a life lasting as long as it takes the cyclic replacement counter to get back to that cache element address.

As an example, in FIG. 5, we will assume that the cyclic replacement counters 520 and 522 are addressing the cache arrays from top to bottom. In cache array 500, the cache element cyclic address is at cache element 524. While the cache element 514 is currently being addressed by steering array 504. Therefore, the cyclic replacement counter has just cycled past the current cache element 514 being addressed from the steering array. On the other hand, in cache array 502, the cyclic replacement counter has just addressed cache element 526 and cache element 518 is the current cache element address from steering array 506. Since the cyclic replacement addresses are moving from top to bottom, if the new answer was overwritten in cache element 524 rather than cache element 526, the old answer in cache element 514 would last longer or survive longer than the old answer in cache element 518. Thus the evaluate age operation 620 would select cache array 500 as the cache array into which the new answer should be written.

After the underlying search finds the new answer, success test operation 622 tests whether a new answer was found. If the underlying search failed, then notify operation 624 sends back a failure-to-retrieve message, and the operation flow returns to the main program. If the underlying search was successful, then the operation flow proceeds to select cache array operation 625. Evaluate age operation 620 indicates to select array operation 625 the best array choice for cyclic replacement. Select array operation selects that array and passes the operation flow to advance and select operation 626.

The advance and select operation 626, the usage bit set operation 628, and the clear operation 630 form a operation loop 632 that operates just as described for operation loop 436 in FIG. 4. In effect, this loop searches to find the next available cache element as indicated by the fact that that cache element's usage bit is not set. When the next available cache element is found, the operation flow passes to replace element operation 634. Operation 634 writes the query arguments and answer into the available cache element of the selected cache array. It leaves the usage bit reset or clear and it loads the cache element index into the steering array at the position addressed by the hash value.

Returning to our example in FIG. 5, the selected cache array is cache array 500 and we will assume that cache element 524 had a usage bit that was not set and thus became the available cache element in the selected cache array. The new answer and arguments are loaded into cache element 524 and its usage bit remains clear or reset. The cache index for cache element 524 is loaded into position 512 of steering array 504. After the replace element operation 634 are completed, the operation flow returns to the main program.

It is apparent to one skilled in the art that the invention can be implemented in various different embodiments. A single steering array with a single cache element has been illustrated and described and parallel cache arrays with parallel steering arrays has been illustrated and described. Additional steering arrays might be use with additional cache arrays. Further, in the parallel cache array, one might use a single cyclic replacement counter to operate on both arrays. Also, in the single cache array environment, additional old answers might be retrieved by chaining further cache elements with the link indexes. All of these alternative embodiments feature a steering array decoupling the hash mechanism from the size of the cache array and a cyclic replacement counter decoupled from the hash mechanism.

While the invention has been particularly shown and described with reference to preferred embodiments thereof, it will be understood by those skilled in the art that various other changes in the form and details may be made therein without departing form the spirit and scope of the invention.

What is claimed is:

1. In a computing system a cache system for retrieving an answer in response to a query, the cache system comprising:
   at least one cache array of cache elements,
   a hash mechanism generating a hash value based on arguments in the query;
   an indirect mapping module mapping the hash value to a cache index and accessing a cache element in a cache array;
   a first retrieve module retrieving an answer from a first cache element if the arguments in the first cache element match the arguments in the query;
   a second retrieve module retrieving an answer from a second cache element if the arguments in the second cache element match the arguments in the query;
   an underlying search module searching for the answer in storage system outside the cache array if neither first retrieve module or the second retrieve module retrieves an answer; and
   a cyclic replacement module cycling through cache elements in one or more cache arrays to select a cache element in which the answer from the underlying search module is stored.

2. The cache system of claim 1 wherein the indirect mapping module comprises:
   a steering array accessed with the hash value and providing a cache index for accessing the cache element.

3. The cache system of claim 2 wherein:
   the first cache element in the cache array stores a link index to the second cache element; and
   the cyclic replacement module stores the link index in the first cache element when the answer from the underlying search module is stored in the first cache element.

4. The cache system of claim 1 wherein there are parallel cache arrays and the indirect mapping module comprises:
   parallel steering arrays both accessed by the hash value and a first steering array providing a first cache index to a cache element in one of the parallel arrays and a second steering array providing a second cache index to a cache element in the other of the parallel arrays.

5. A cache system for retrieving an answer in response to a query, the cache system comprising:
   a hash mechanism computing a hash value from arguments in the query;
   a cache with a plurality of cache cells, each cell having an answer and a usage bit indicating whether the cell is in use;
   a steering array storing a cache index based on the hash value, the cache index pointing to a cache cell that may contain the answer;
   a cyclic replacement counter addressing each cell in the cache to determine if the cell is still in use.

6. The cache system of claim 5 and in addition:
   each cell having arguments for comparison against arguments in the query.

7. The cache system of claim 6 and in addition:
   each cell having a link index pointing to another cache cell that may contain the answer.

8. The cache system of claim 5 further comprising:
   an additional cache; and
   an additional steering array also storing a cache index based on the hash value, the cache indexes from both steering arrays pointing to a cache cell in each cache that may contain the answer.

9. In a computing system having a cache system, a method for optimizing the use of the cache, the method comprising;
   indirectly mapping a query to a cache cell in a cache array;
   retrieving an answer from a first cache cell mapped to by the act of mapping;
   retrieving an old answer from a second cache cell mapped to by the act of mapping;
   searching for a new answer outside of the cache if neither act of retrieving is successful; and
   cyclic accessing through cells in the cache to replace an answer in a cell with a new answer from the act of searching.

10. The method of claim 9 wherein the act of indirect mapping comprises:
    computing a hash value from arguments in the query; and
    looking up a cache index in a steering array based on the hash value.

11. The method of claim 9 wherein the act of mapping further comprises:
    retrieving a link index to the second cache cell from the first cache cell.

12. The method of claim 11 wherein the act of cyclic accessing comprises:
    advancing an address to select in turn each cache cell in the cache;
    testing each cache cell when addressed to detect whether or not the cache cell has been used since the last time the cache cell was selected by the act of advancing; and
    replacing the answer in the cache cell selected by the act of advancing with the new answer from the act of searching.

13. The method of claim 9 wherein the cache has two parallel cache arrays and two steering arrays and the act of indirect mapping comprises:
    computing a hash value from arguments in the query; and
    looking up a cache index in each steering array based on the hash value, the cache index in each steering array pointing to a cache cell in separate ones of the parallel cache arrays.

14. The method of claim 13 wherein both acts of retrieving are performed in parallel.

15. The method of claim 14 wherein the act of cyclic accessing comprises:

advancing an address to select in turn each cache cell in each cache array;

testing each cache cell when addressed to detect whether or not the cache cell has been used since the last time the cache cell was selected by the act of advancing and marking the cache cell as an available cache cell if it has not been used;

evaluating ages of the available cache cells in each cache array to determine the remaining cyclic life of each of the available cache cells;

selecting the cache array having the greater remaining cyclic life as a selected array; and replacing the answer in the available cache cell of the selected array with the new answer from the act of searching.

16. A computer storage media readable by a computing system and encoding a computer program of instructions for executing a computer process for a cache system for retrieving an answer in response to a query, said computer process comprising:

generating a hash value based on arguments in the query;

mapping the hash value to a cache index and accessing a cache element in a cache array;

retrieving an answer from a first cache element if the arguments in the first cache element match the arguments in the query;

retrieving an answer from a second cache element if the arguments in the second cache element match the arguments in the query;

searching for the answer in a storage system outside the cache array if neither act of retrieving retrieves an answer for the query; and cycling through cache elements in one or more cache arrays to select a cache element in which the answer from the act of searching may be stored.

17. The storage media of claim 16 wherein the first cache element in the cache array stores a link index to the second cache element and the act of mapping comprises:

accessing a steering array with the hash value and providing a cache index for accessing the first cache element; and accessing the second cache element based on the link index in the first cache element.

18. The storage media of claim 17 wherein the act of cycling through cache elements comprises:

advancing an address to select in turn each cache element in the cache;

testing each cache element when addressed to detect whether or not the cache element has been used since the last time the cache element was selected by the act of advancing;

replacing the answer in the cache element selected by the act of advancing with the new answer from the act of searching; and storing the link index in the cache element selected by the act of advancing.

19. The storage media of claim 16 wherein there are parallel cache arrays and parallel steering arrays and the act of mapping comprises:

accessing both steering arrays with the hash value;

providing from a first steering array a first cache index based on the hash value to a cache element in one of the parallel arrays; and providing from a second steering array a second cache index based on the hash value to a cache element in the other of the parallel arrays.

20. The storage media of claim 19 wherein the act of cycling through cache elements comprises:

advancing an address to select in turn each cache element in each cache array;

testing each cache element when addressed to detect whether or not the cache element has been used since the last time the cache element was selected by the act of advancing and marking the cache element as an available cache element if it has not been used;

evaluating ages of the available cache elements in each cache array to determine the remaining cyclic life of each of the available cache elements;

selecting the cache array having the greater remaining cyclic life as a selected array; and replacing the answer in the available cache element of the selected array with the new answer from the act of searching.

* * * * *